United States Patent
Chen et al.

(10) Patent No.: US 8,609,985 B2
(45) Date of Patent: Dec. 17, 2013

(54) ELECTRONIC DEVICE HOUSING AND MANUFACTURING METHOD

(75) Inventors: Mi-Chien Chen, New Taipei (TW); Chun-Jen Lin, New Taipei (TW); Shien-Cheng Kuo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 147 days.

(21) Appl. No.: 13/299,427

(22) Filed: Nov. 18, 2011

(65) Prior Publication Data
US 2013/0002102 A1     Jan. 3, 2013

(30) Foreign Application Priority Data
Jun. 28, 2011  (CN) .......................... 2011 1 0176614

(51) Int. Cl.
*H05K 5/00*  (2006.01)

(52) U.S. Cl.
USPC ............. 174/50; 174/520; 174/559; 174/560; 361/679.02; 455/575.1; 156/329

(58) Field of Classification Search
USPC .............. 174/50, 520, 66, 67, 559, 560, 564, 174/152 R; 220/3.2, 3.3, 4.02, 3.8; 361/600, 361/601, 679.01, 679.02, 679.4; 455/575.1, 455/344, 347; 156/329
See application file for complete search history.

(56) References Cited

U.S. PATENT DOCUMENTS

| | | | |
|---|---|---|---|
| 7,385,874 B2 * | 6/2008 | Vuilleumier et al. | 455/344 |
| 7,436,653 B2 * | 10/2008 | Yang et al. | 455/575.1 |
| 7,697,269 B2 * | 4/2010 | Yang et al. | 361/679.01 |
| 7,733,642 B2 * | 6/2010 | Liou et al. | 361/679.4 |
| 7,948,746 B2 * | 5/2011 | Nakatani et al. | 174/66 |
| 8,148,633 B2 * | 4/2012 | Hung | 174/50 |
| 8,395,894 B2 * | 3/2013 | Richardson et al. | 455/575.1 |

* cited by examiner

*Primary Examiner* — Angel R Estrada
(74) *Attorney, Agent, or Firm* — Altis Law Group, Inc.

(57) ABSTRACT

An electronic device housing is disclosed. The electronic device housing, the electronic device housing comprises a cover comprising a base board, a receiving portion defined in the base board, and a fixing portion in the receiving portion; a silicone rubber membrane; and a panel received in the receiving portion, the panel is fixed to the cover via the silicone rubber membrane.

13 Claims, 5 Drawing Sheets

ELECTRONIC DEVICE HOUSING AND MANUFACTURING METHOD

BACKGROUND

1. Technical Field

The present disclosure relates to housings, particularly to a housing for electronic device and a method for manufacturing the housing.

2. Description of Related Art

With developments in technology, electronic devices such as mobile phones, computers, and panel computers are not only required to perform many functions, but also provide an appearance appealing to a user. In order to make an electronic device thinner and lighter, it is a common procedure to attach a panel to a cover of the electronic device by an adhesive. However, when the electronic device needs to be repaired, it may be hard to disassemble the panel from the cover of the electronic device without damaging the panel. In addition, the panel may also be damaged due to scraping away of the adhesive away. As a result, the maintenance cost of the electronic device may be increased and the maintenance efficiency of the electronic device may be decreased.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the housing. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
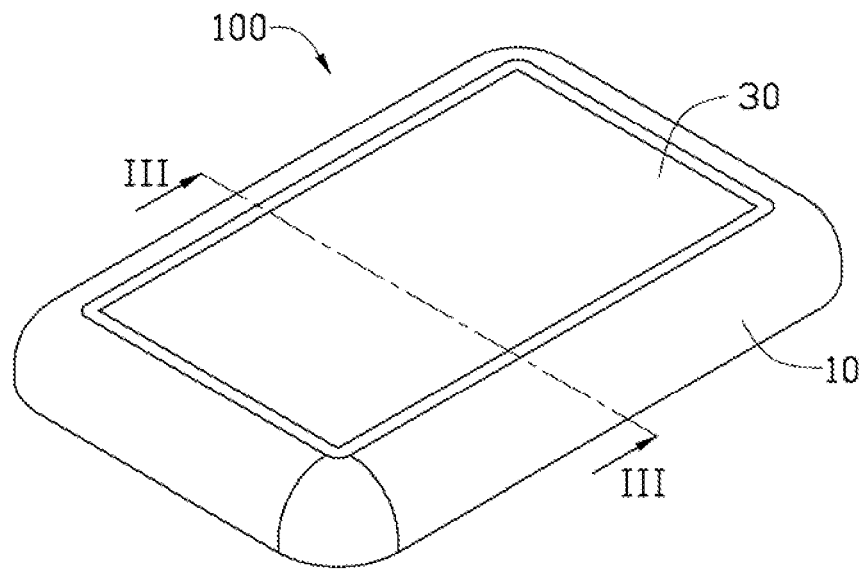
FIG. 1 is an isometric view of a first embodiment of a housing for electronic device.
Figure 2:
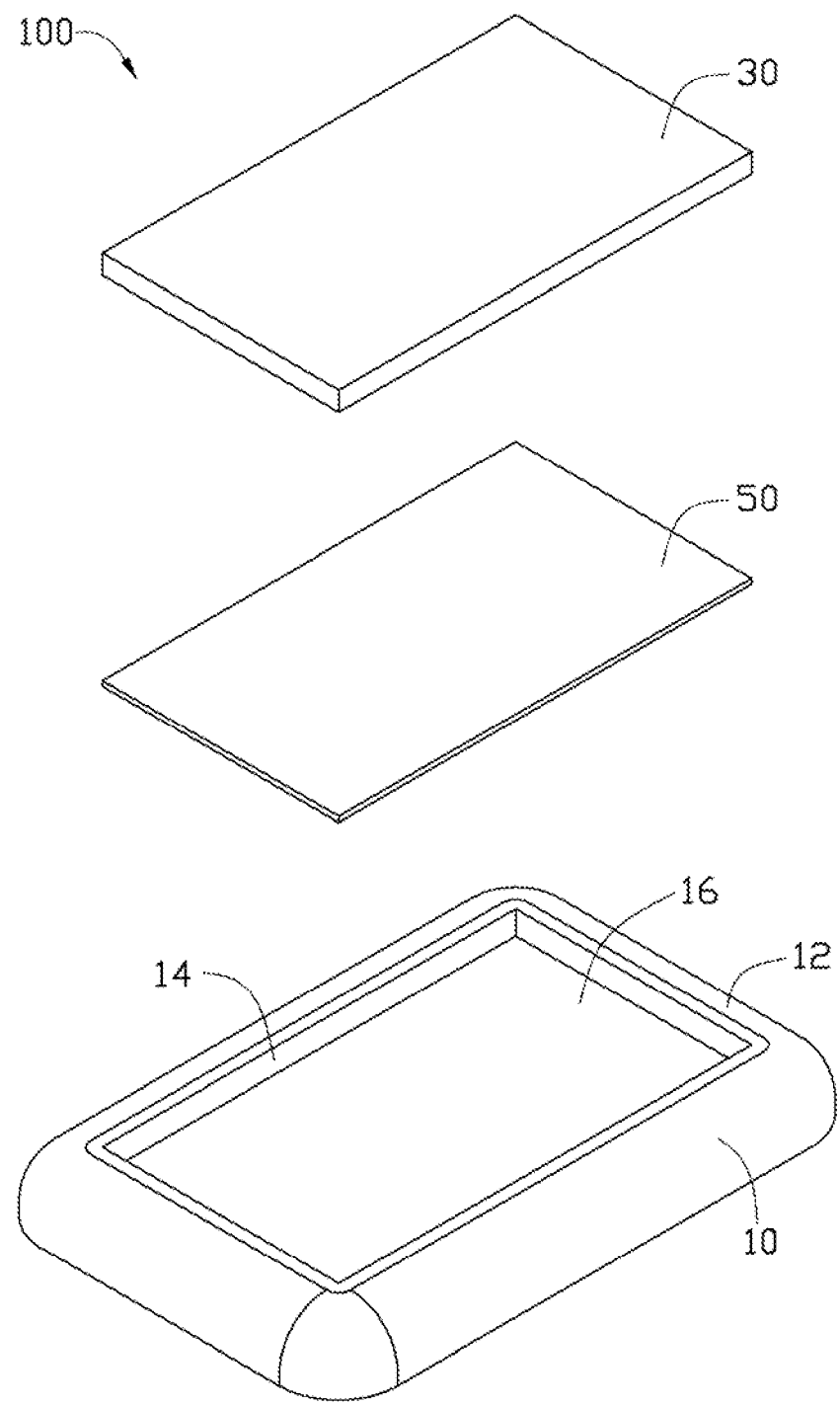
FIG. 2 is an exploded, isometric view of the housing of FIG. 1.

Referring to FIGS. 1 and 2, an embodiment of a housing 100 for electronic device comprises a cover 10, a panel 30, and a silicone rubber membrane 50 to adhere the panel 30 to the cover 10. The housing 100 may be for a notebook computer, a liquid crystal display, a mobile phone, a tablet computer, or other electronic devices. In the illustrated embodiment, the housing 100 is for a tablet computer.

Figure 3:
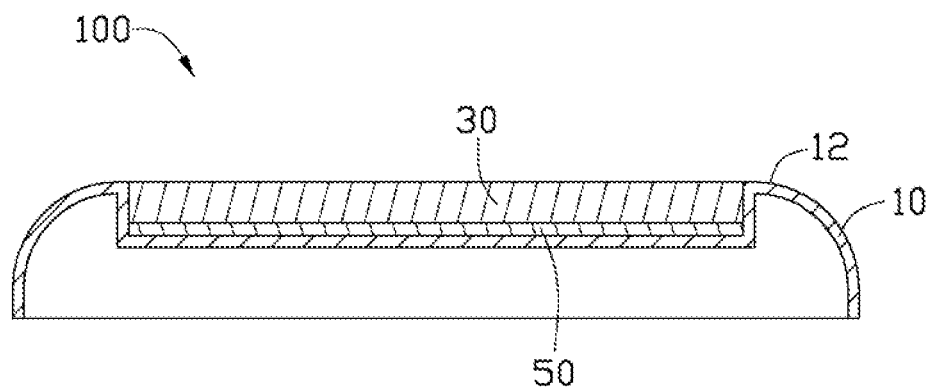
FIG. 3 is a partial, cross-section of the housing of FIG. 1, taken along line III-III.

Referring to FIG. 3, in the illustrated embodiment, the cover 10 is made of plastic materials. In alternative embodiments, the cover 10 may be made of metal materials. The cover 10 comprises a base board 12, and a receiving portion 14 defined in the base board 12. The receiving portion 14 is a substantially rectangular groove to receive the panel 30. The cover 10 further comprises a fixing plane portion 16 at a bottom surface of the receiving portion 14.

The silicone rubber membrane 50 may be made of silicone rubber. Silicone rubber is a rubber-like material composed of silicone that is a polymer containing silicon with carbon, hydrogen, and oxygen. In the illustrated embodiment, the silicone rubber membrane 50 may be a substantially rectangular thin sheet which adheres the panel 30 to the fixing plane portion 16 of the cover 10. The silicone rubber membrane 50 may be reused after the silicone rubber membrane 50 is stripped from the fixing plane portion 16.

During the assembly of the housing 100, the silicone rubber membrane 50 is adhered to the fixing plane portion 16 of the cover 10. The panel 30 is received in the receiving portion 14, and is fixed to the cover 10 by the silicone rubber membrane 50.

When disassembling the panel 30 from the cover 10, the panel 30 may be striped from the silicone rubber membrane 50. To re-assemble the electronic device, the panel 30 may be fixed back to the cover 10 by the silicone rubber membrane 50.

In alternative embodiments, the silicone rubber membrane 50 may be a silicone rubber film printed on the fixing plane portion 16 of the cover 10, or on a surface of the panel 30 adjacent to the cover 10.

Figure 4:
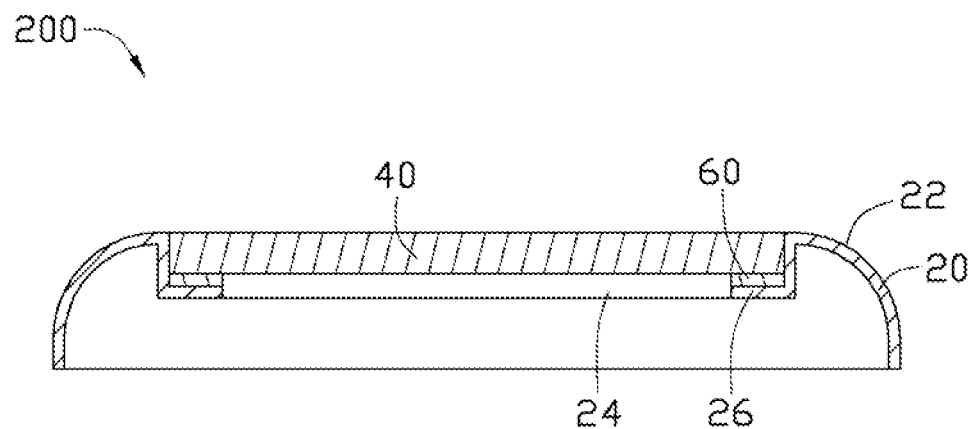
FIG. 4 is a partial, cross-section of a second embodiment of a housing for electronic device.

Referring to FIG. 4, an alternative embodiment of a housing 200 comprises a cover 20, a panel 40, and a silicone rubber membrane 60. The cover 20 comprises a base board 22, and a receiving portion 24 defined in the base board 22. In the illustrated embodiment, the receiving portion 24 is a substantially rectangular stepped hole. The cover 20 further comprises a fixing annular portion 26 extending from an inner sidewall of the receiving portion 24 toward a center of the cover 20. The panel 40 is fixed on the fixing annular portion 26 of the cover 20 by the silicone rubber membrane 60.

In other embodiments, the fixing annular portion 26 may be a plurality of protrusions substantially coplanar extending from the inner sidewall of the receiving portion 24 toward a center of the cover 20. The silicone rubber membrane 60 may be made of a plurality of silicone rubber sheets corresponding to the plurality of protrusions.

To assemble the housing 200, the silicone rubber membrane 60 is adhered to the fixing annular portion 26 of the cover 20. Then the panel 40 is received in the receiving portion 24, and is fixed to the cover 20 by the silicone rubber membrane 60.

To disassemble the panel 40 from the cover 20, the silicone rubber membrane 60 may be striped from the panel 40. To re-assemble the electronic device, the panel 40 may be fixed back to the cover 20 by the silicone rubber membrane 60.

In yet another embodiments, the silicone rubber membrane 60 may be a silicone rubber film printed on the fixing annular portion 26 of the cover 20, or on a surface of the panel 40 adjacent to the cover 20.

Figure 5:
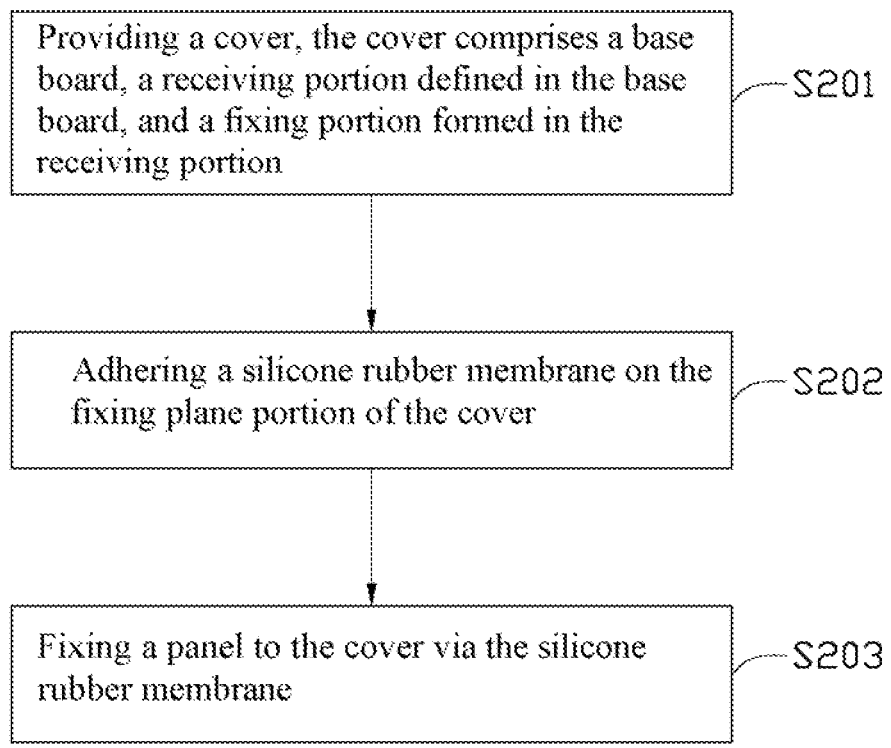
FIG. 5 is a flowchart of manufacturing a first embodiment of a housing for electronic device of the present disclosure.

Referring to FIG. 5, wherein a flowchart for manufacturing the housing 100 of the present disclosure is shown.

In step S201, the cover 10 is provided. In the illustrated embodiment, the cover 10 comprises a base board 12, a receiving portion 14 defined in the base board 12, and a fixing plane portion 16 formed on a bottom surface of the receiving portion 14.

In step S202, a silicone rubber membrane 50 is adhered to the fixing plane portion 16 of the cover 10. In the illustrated embodiment, the silicone rubber membrane 50 is a thin silicone rubber sheet. In alternative embodiments, the silicone rubber membrane 50 may be a silicone rubber film printed on the fixing plane portion 16 of the cover 10.

In step S203, a panel 30 is fixed to the cover 10 by the silicone rubber membrane 50.

The silicone rubber membrane 50 adheres the panel 30 to the fixing plane portion 16 of the cover 10. The silicone rubber membrane 50 may be reused, and it may be easy to assemble or disassemble the housing 100 without damaging the panel 30. Therefore, maintenance efficiency may be improved and maintenance cost be reduced of the electronic device using the housing 100.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An electronic device housing, the electronic device housing comprising:
   a cover comprising a base board, a receiving portion defined in the base board, and as fixing portion in the receiving portion;
   a silicone rubber membrane; and
   a panel received in the receiving portion, and the panel is fixed to the cover via the silicone rubber membrane;
   wherein the receiving portion is a substantially rectangular groove, the silicone rubber membrane is affixed to the fixing portion, the panel is disposed in the receiving portion completely, and the silicone rubber membrane is configured for adhering the panel to the base board of the cover stably.

2. The electronic device housing of claim 1, wherein the fixing portion is a fixing plane portion at a bottom surface of the receiving portion.

3. The electronic device housing of claim 1, wherein the receiving portion is a stepped hole defined in the base board, and the fixing portion is a fixing annular portion extending from an inner sidewall of the stepped hole toward a center of the cover.

4. The electronic device housing of claim 1, wherein the receiving portion is a stepped hole defined in the base board, and the fixing portion comprises a plurality of protrusions substantially coplanar extending from an inner sidewall of the stepped hole toward a center of the cover.

5. The electronic device housing of claim 1, wherein the silicone rubber membrane is a rectangular thin sheet.

6. The electronic device housing of claim 1, wherein the silicone rubber membrane is a silicone rubber film printed on the fixing portion of the cover, or a silicone rubber film printed on a surface of the panel adjacent to the cover.

7. The electronic device housing of claim 1, wherein the cover is made of a plastic material.

8. The electronic device housing of claim 1, wherein the cover is made of a metallic material.

9. An electronic device housing manufacturing method, the method comprising:
   providing a cover with a base board, a receiving portion defined in the base board, and a fixing portion formed in the receiving portion;
   adhering a silicone rubber membrane on the fixing plane portion of the cover; and
   fixing a panel to the cover via the silicone rubber membrane;
   wherein the receiving portion is a substantially rectangular groove, the silicone rubber membrane is affixed to the fixing, portion, the panel is disposed in the receiving portion completely, and the silicone rubber membrane is configured for adhering the panel to the base board of the cover stably.

10. The electronic device housing manufacturing method of claim 9, wherein the silicone rubber membrane is a rectangular thin sheet.

11. The electronic device housing manufacturing method of claim 9. wherein the silicone rubber membrane is a silicone rubber film printed on the fixing portion of the cover.

12. The electronic device housing manufacturing method of claim 9, wherein the cover is made of a plastic material.

13. The electronic device housing manufacturing method of claim 9, wherein the cover is made of a metallic material.

* * * * *